United States Patent [19]

Pieslak et al.

[11] Patent Number: 4,997,685

[45] Date of Patent: Mar. 5, 1991

[54] ELONGATED SUBSTRATE WITH POLYMER LAYER COVERING

[75] Inventors: George Pieslak, Menlo Park; Tony G. Alvernaz, Fremont, both of Calif.; Robin John, Kessel-lo, Belgium; James A. Rinde, Fremont, Calif.; Eric Van Zele, Atherton, Calif.

[73] Assignee: Raychem Corporation, Menlo Park, Calif.

[21] Appl. No.: 399,422

[22] Filed: Aug. 25, 1989

Related U.S. Application Data

[63] Continuation of Ser. No. 236,349, Aug. 22, 1988, abandoned, which is a continuation of Ser. No. 128,293, Dec. 3, 1987, abandoned, which is a continuation of Ser. No. 789,001, Oct. 18, 1985, abandoned, which is a continuation-in-part of Ser. No. 670,245, Nov. 9, 1984, abandoned, which is a continuation-in-part of Ser. No. 702,116, Feb. 15, 1985, abandoned.

[51] Int. Cl.$^5$ .............................................. B05D 3/02
[52] U.S. Cl. ................................ 427/407.1; 427/409; 427/410; 156/86; 156/187; 156/188; 156/244.12

[58] Field of Search ................... 427/407.1, 409, 410; 156/86, 187, 188, 244.12

[56] References Cited

FOREIGN PATENT DOCUMENTS 65838 12/1982 European Pat. Off. .

Primary Examiner—Thurman K. Page
Attorney, Agent, or Firm—Edith A. Rice; Herbert G. Burkard

[57] ABSTRACT

The invention relates to a method for applying a protective coating to a substrate, such as metallic pipe, which comprises applying onto the substrate a liquid curable polymeric composition capable of curing to a substantial extent within about 24 hours at less than about 80° C., then applying one or more polymeric layers, the innermost of which is capable of interacting with said curable composition, and permitting the composition to cure. In certain embodiments the polymeric layer is applied as a polymeric article, in other embodiments a multiple layer polymeric covering is applied over the curable composition.

21 Claims, No Drawings

ELONGATED SUBSTRATE WITH POLYMER LAYER COVERING

This application is a continuation of application Ser. No. 236,349, filed Aug. 22, 1988, now abandoned, which is a continuation of application Ser. No. 128,293, filed Dec. 3, 1987, now abandoned, which is a continuation of copending application Ser. No. 789,001 filed Oct. 18, 1985, and now U.S. Pat. No. 4,732,632, which is a continuation-in-part of application Ser. No. 670,245 filed Nov. 9, 1984 and application Ser. No. 702,116 filed Feb. 15, 1985, both now abandoned, the disclosures of which are incorporated herein by reference.

BACKGROUND OF THE INVENTION

The invention relates to a method for applying a protective coating to a substrate, in particular a metallic pipe and polymeric substrate.

To protect substrates such as metallic pipes and pipelines from, for example, corrosion or mechanical abuse, a protective coating may be applied.

Various coatings for such substrates are known and many are commercially available. One class of coatings that has been found to be effective include the so-called fusion bonded epoxy coatings. These coatings are applied to the substrate in powdered form and are then heated to relatively high temperatures, about 200°-300° C., to cause the powder particles to fuse and flow together and cure to form a continuous coating bonded to the substrate. Typically, the substrate is preheated to these high temperatures before the powdered resin is applied. For good adhesion between the epoxy coating and the pipe, it is generally required that the surface of the pipe be adequately cleaned and abraded. The fusion bonded coating may be further protected by application of one or more additional layers. Coating systems of this type are disclosed in U.S. Pat. Nos. 4,213,486 to Samour and 4,510,007 to Stucke. A modification of this coating approach is disclosed in U.S. Pat. No. RE30,006 to Sakayori et al in which a modified polyolefin is applied to an uncured epoxy resin coated on a metal surface and then the system is heated to melt bond the uncured epoxy resin and the polyolefin and to cure the epoxy resin. The temperature utilized must be above the melting point of the polyolefin, generally between 80° and 350° C.

Another coating technique is disclosed in U.S. Pat. No. 3,231,443 to McNulty in which a cured resin layer (e.g. epoxy) carried on a film backing is applied over an uncured resin layer (e.g. epoxy) coated on the substrate to be protected. The cured and uncured resins interact to form a protective coating. It is said that the coating can be applied in the field. Cured epoxy resins are generally brittle and thus precuring the resin as suggested in McNulty is likely to be difficult under actual pipe installation conditions, particularly if the pipe is of relatively small diameter.

Yet another approach to coating metal substrates is described in U.S. Pat. No. 3,502,492 to Spiller. In this approach a thin layer of powdered epoxy resin is coated on the metal surface and then a thick layer of plasticized polyvinyl chloride particles are applied. The coating is heated causing both the epoxy powder and the polyvinyl chloride powder to adhere to each other and to the underlying substrate. A continuous epoxy-polyvinyl chloride interface is not formed.

In general the above techniques because of the high temperatures and complex equipment required are limited to factory application of the coating or are otherwise impractical under actual field conditions. Application of pipeline coatings in the field, or protection of other substrates such as cable splices, require techniques that employ more moderate temperatures and portable equipment. One successful technique for coating pipelines in the field is the use of a heat-recoverable (i.e. heat shrinkable) polymeric article, such as a tube, sheet or tape, in combination with a heat activatable sealant. In installing such coatings, a torch or other heat source is generally used to heat the article to cause it to recover. This heat also raises the temperature of the heat activatable sealant to above its activation temperature so that a strong bond is formed between the polymeric article and the substrate. Suitable sealants include hot melt adhesives and mastics. There are certain applications in which the substrate may act as a heat sink and prevent the interface between the adhesive and the pipe from attaining the minimum bond line temperature required to form a strong bond between the adhesive and the pipe. One such situation is an oil-carrying pipeline in which the oil is between 25°-50° C. Under these conditions it is difficult to retrofit or repair a pipeline coating with a heat recoverable article such as described above.

We have now discovered a coating method which overcomes the deficiencies of these prior techniques. The methods of this invention do not require the high temperature and complex equipment requirements of fusion bonded epoxies and can be used to retrofit or repair existing pipelines carrying oil at temperatures below the activation temperature of typical heat activatable sealants. The method is versatile and can be used in a factory, at a field plant or "over the ditch" to apply protective coatings to various substrates in particular metallic pipelines. The method can be used to protect a variety of substrates including cables, cable splices, conduits, and the like.

SUMMARY OF THE INVENTION

It has further surprisingly been found that not only is the unique method versatile and suitable for field or factory use, but the resulting coating on the pipe is superior to similar coatings applied by different techniques.

One aspect of this invention comprises a method of applying a protective covering to an elongate substrate which comprises:
  (a) applying to the substrate at a temperature of not more than about 80° C., a curable polymeric composition which is a liquid at about 20° C., is curable to a substantial extent within about 24 hours at a temperature of not more than about 80° C., and comprises
    (i) a resin component;
    (ii) a curing agent;
  (b) applying a single layer, polymeric article comprising a material capable of interacting with said curable composition, over the curable polymeric composition in a manner such that a surface of the article is in intimate contact with the composition; and
  (c) allowing the curable composition to cure while maintaining intimate contact between the polymeric article and said composition at a temperature at which the material of the article does not melt or flow.

Another aspect of the invention comprises a method of applying a protective covering to an elongate substrate which comprises:
(a) applying to the substrate at a temperature of not more than about 80° C., a curable polymeric composition which is a liquid at about 20° C., is curable to a substantial extent within about 24 hours at a temperature of not more than about 80° C., and comprises
   (i) a resin component;
   (ii) a curing agent;
(b) applying a multiple-layer polymeric covering, having an innermost layer and an outermost layer, the innermost layer comprising uncured polymeric material capable of interacting with said curable composition, over the curable polymeric composition in a manner such that said innermost layer is in intimate contact with said composition; and
(c) allowing the curable composition to cure while maintaining intimate contact between said innermost layer and said composition at a temperature at which the outermost layer of the covering does not melt or flow.

Another aspect of the invention comprises a method of applying a protective covering to an elongate substrate which comprises:
(a) applying to the substrate a curable polymeric composition comprising:
   (i) a resin component;
   (ii) a curing agent; and
   (iii) a Bronsted base in an amount sufficient to provide an excess of Bronsted base in the composition when cured;
(b) applying a polymeric layer over the curable polymeric composition such that a surface of the polymeric layer is in intimate contact therewith, said polymeric layer being capable of interacting with said curable composition; and
(c) allowing the curable composition to cure while maintaining intimate contact between the polymeric layer and said composition.

DETAILED DESCRIPTION OF THE INVENTION

Substrates which can be protected by the method of the invention are preferably elongate substrates. The substrates are more preferably cylindrical and even more preferably hollow cylinders, such as pipes or tubing and especially pipes or tubing for carrying oil or gas. The substrate may be of any desired composition but it is preferred that the substrate be metallic or polymeric. Metallic substrates such as pipelines normally comprise iron, steel or steel alloys but may comprise any metal. Polymeric substrates can be polymeric tubing or pipes or polymeric coatings on other substrates. For example, the method of the invention can be used to repair a polymeric coating on a steel pipe or an exposed joint area between two coated pipes. The method of the invention can be used to protect the polymeric coating as well as any exposed metallic substrate.

In accordance with this invention, the substrate is first coated with a curable polymeric composition. The curable polymeric composition is a liquid at about 20° C. and is curable to a substantial extent within about 24 hours at a temperature of not more than about 80° C. By "curable to a substantial extent" is meant that the composition has cured to at least about 50%, preferably at least about 65%, most preferably at least about 80%, of its fully cured state. The time to substantially cure varies greatly dependent on the particular composition, actual conditions of application, temperature, etc. For many applications it is desirable to use a curable composition which substantially cures in less than about 12 hours, preferably less than about 6 hours. For coating metallic pipes, it is generally preferred to use a curable composition which substantially cures in about 2 to about 30 minutes at 80° C. or less.

The curable polymeric composition comprises a resin component, a curing agent and optionally a Bronsted base. The resin component is preferably a liquid at 20° C. The curing agent also is preferably a liquid at 20° C. A solvent may be present in the curable composition but preferred curable compositions contain little or no solvent. In general, no more than about 20% by weight of the composition should comprise solvent, preferably no more than about 5% and most preferably the composition is solvent-free.

The resin component of the curable composition preferably comprises a thermosetting resin, for example a liquid epoxy resin, such as bisphenol A epoxies, novolak epoxies, 1,2-epoxies, or coal tar epoxies, prepolymer precursers of polyurethanes and/or coal tar urethanes, polyesters (unsaturated and alkyl), acrylates, polyimides, silicones, etc.

The curable polymeric composition also comprises a curing agent for the resin component. The curing agent is selected such that under the conditions of application the resin selected will be cured to a substantial extent within the desired time period. In preferred embodiments, the resin component comprises an epoxy resin and the curing agent may be a catalytic curing agent, a reactive curing agent or mixtures thereof. Examples of catalytic curing agents are anionic catalysts such as metal alkoxides, isocyanurates or more preferably materials containing free amine groups. Preferred catalytic curing agents are tertiary amines, for example, pyridine, 2,4,6-tris(dimethylaminomethyl) phenol, dimethylaminopropyl amine, benzyldimethyl amine, triethyl amine or 1-methyl imidazole; or secondary amines, for example, piperidine, diethanol amine or imidazole. Examples of reactive curing agents include polyamides (for example, Versamid Polyamides from Henkel), polyamines, for example, ethylene diamine, ethylene triamine, diethylene triamine, or triethylene tetramine, and adducts of the above polyamides and polyamines or similar amines, for example the adduct of polyamide with a bisphenol A epoxy resins. Other catalysts useful in combination with reactive curing agents include phenolic compositions such as phenol, bisphenol A, catechol, resorsinol and other compounds containing hydroxy groups.

The curing agent or combination of curing agents used comprise at least one substance which is a Bronsted base. A Bronsted base is a molecular substance capable of accepting a proton (i.e. a hydrogen ion). It has been found that surprisingly strong bonds and resistance to cathodic disbonding are achieved when the curable polymeric composition results in a cured composition which is basic. To ensure basicity of the cured composition, excess Bronsted base, that is an amount in excess of that required to effect curing of the composition is preferably used. Generally, the Bronsted base is added in an amount of at least 0.01 moles in excess of that necessary to effect cure of the composition. Preferably, the Bronsted base is added in an amount of 0.01 to about 2 moles in excess. In a preferred embodiment the Bronsted base is a reactive curing agent and is used in an amount greater than a 1:1 ratio of basic curing agent to reactive resin, and preferably between a ratio of about 1:1 to about 3:1.

When providing excess base it is important that the cured polymeric composition have the appropriate hardness and resistance to cathodic disbonding, either or both of which can be adversely affected if too much Bronsted base is added. When excess base is added to the curable composition the Tg of the resulting cured polymeric composition is lowered. In general, it is preferred that the cured composition have a Tg of at least about 50° C., and preferably between about 50° to about 120° C. to provide the necessary properties.

The curable polymeric composition may contain an additive for improving the adhesion of the curable polymeric composition to the substrate such as coupling agents or adhesion promoters. Such additives can be in the resin, the curing agent or added separately and include, for example, silanes, p-quinone oximes, dioximes and metal deactivators. These additives preferably are included in an amount of from about 0.1% to about 10% by weight, based on the weight of the curable polymeric composition.

Preferred curable compositions contain a silane as an adhesion promoting additive. Silanes are compounds similar to hydrocarbons in which at least one tetravalent Si replaces a C atom. A wide variety of silanes are known and many commercially produced silanes are available. See, for example, U.S. Pat. No. 3,490,934, incorporated herein by reference. Other representative examples of silanes include gamma-glycidoxy-propyl-trimethoxy silane, gamma-amino propyl trimethoxy silane, aminopropyltriethoxy silane, 3-(2-aminoethyl) (aminopropyl) trimethoxy-silane, glycidoxy propyl-trimethoxysilane, vinyltriacetoxy silane, vinyltris (methoxyethoxy)-silane,beta-(3,4-epoxy cyclohexyl)ethyl trimethoxy silane, and N-vinylbenzyl-N-2(trimethoxysilyl propylamino) ethyl ammonium choride.

Examples of p-quinone oximes and dioximes and metal diactivaters are disclosed in U.S. Pat. Nos. 4,455,204, 4,287,034, 3,658,755 and 3,799,908, incorporated herein by reference.

The components of the curable polymeric composition (i.e. resin, curing agent, excess Bronsted base, if present, and any additives) are mixed prior to application. The curable polymeric composition is applied to the area of the substrate to be protected at a temperature ($T_1$) which is from about ambient temperature (i.e. about 20° C.) to not more than about 80° C, preferably not more than about 60° C. It is preferred to preheat the substrate to about $T_1$ before applying the curable composition. The substrate may be preheated by any convenient technique. Where the substrate is a pipeline carrying oil or other fluid at temperatures of about $T_1$, a separate preheated step is not necessary. Preheating of the substrate may also be achieved during cleaning thereof, for example, shotblasting of metallic pipes heats the pipe up to about 50° C. Welding of metal pipes, for example when welding together pipe ends, may also heat the pipe to the desired temperature. Direct heating of the substrate, for example, with a torch or other flame may be desired if the substrate is not otherwise preheated.

The curable polymeric composition may be applied by any method for applying liquid coating compositions, for example, brushing, wiping, dipping or spraying. The curable polymeric composition may be applied in one or more coats if desired. Subsequent coats may be applied directly to the previous coat or applied to the surface of the polymeric layer which is to come into intimate contact therewith.

The curable composition is preferably applied in an amount to provide a coating between about 2 to about 10 mils thick, preferably about 3 to about 7 mils.

The curable polymeric composition is covered by one or more polymeric layers before it is permitted to cure to a substantial extent, that is while it is substantially uncured. The polymeric layer or layers may be applied by any convenient technique, for example, extrusion, spraying, wrapping, shrinking, pressing, painting, dipping, electrostatic depositing, etc.

The innermost polymeric layer, that is the layer placed in direct contact with the curable composition, is capable of interacting with the curable composition. This layer is maintained in intimate contact with the curable composition while it is uncured. The terms "interact" or "interacting" are used herein to mean that the innermost layer and the curable composition form an integral unit, i.e. cannot be readily separated, when the curable composition is cured in intimate contact with the innermost layer. The interaction can be physical or chemical. Physical interaction can be, for example, penetration of the curable composition into the material of the innermost polymeric layer where it becomes entrapped on curing thereof. Penetration of the curable composition by absorption or adsorption into the polymeric layer may be enhanced, if desired, by incorporating into the polymeric layer an appropriate filler. Fillers that can be used include pigments, agents such as carbon black, alumina trihydrate, clay, mineral fiber, silica, calcium silicate, barium sulfate, zinc sulfate, titanium dioxide, zinc sulfide, lithopone, ferric oxide, coated or functionalized fillers such as functionalized aluminum silicates such as mecaptans, amine or vinyl, or silanes, organic titinates, etc.

Another example of physical interaction comprises the use of a polar curable composition, e.g. an epoxy-based curable composition, together with a polar innermost polymeric layer so that a polar interaction occurs at the intimate interface between the two materials.

Chemical interaction comprises the formation of chemical bonds between the curable composition and the innermost polymeric layer. For example, the use of an innermost polymeric layer containing reactive amine groups either in the polymer structure or as an additive, over a curable epoxy resin layer will result in formation of bonds between the curable composition and the polymeric layer.

Where the curable polymeric composition is covered by only one polymeric layer, i.e. a single polymeric layer, it is preferred that the layer be applied as a preformed shaped article, such as a tape, sheet, patch or tube. Since this is the only layer applied, it will be placed in intimate contact with the curable composition. Thus, it is in essence the innermost layer and should be capable of interacting with the curable composition, as discussed above. The polymeric article can be dimensionally recoverable, and is preferably heat recoverable. The article is placed around the substrate, e.g. by wrapping, and heat is applied to cause the article to recover, that is, shrink, into contact with the curable composition on the substrate. The curable composition is then permitted to cure. It is desirable that the curing step be conducted at a temperature at which the polymeric article does not melt or flow.

The single polymeric layer preferably comprises a polyolefin such as polyethylene or polypropylene; acrylic rubber; EPDM; nitrile rubber; nylon; epichlorohydrin elastomer; polysulfide; acrylic elastomer; butyl rubber or the like. Particularly preferred is crosslinked polyethylene.

In embodiments in which more than one layer is applied over the curable composition, the innermost layer is selected so that it is capable of interaction with the curable composition. Preferably the innermost layer comprises an uncured material and more preferably comprises a heat activatable sealant. Examples of heat activatable sealants include the hot melt adhesives. The hot melt adhesive can be any sealant typically used to bond corrosion protection coatings to metal and particularly those generally used to bond a coating to a pipeline which is cathodically protected (e.g. impressed current or sacraficial anode) to protect the pipeline from corrosion, abrasion or impact damage, etc. Such hot melt adhesives include those based on thermoplastic polyamides, polyolefins, polyesters, polyurethanes, polysulfides and the like. Especially preferred are polyamideor ethylene terpolymer-based hot melt adhesives. Particularly preferred are hot melt adhesives containing ethylene co- or terpolymers, for example co- or terpolymers of ethylene with one or more of vinyl acetate, maleic anhydride, acrylic acid, methacrylic acid or alkyl acrylate such as ethyl acrylate. Various additives may be included in the hot melt adhesive as desired such as waxes, rubbers, stabilizers and the like. Other examples of additives are in U.S. Pat. Nos. 4,455,204 and 4,287,034 incorporated herein by reference.

The outermost polymeric layer is preferably a preformed shaped article. A preferred method of applying more than one polymeric layer over the curable composition is to use a polymeric article coated on one surface thereof with the material to be placed in contact with the curable material, e.g. a heat activatable sealant. In a particularly preferred embodiment, a heat recoverable polymeric article coated on the surface thereof with a heat activatable adhesive, as described above, is used to apply a double layer polymeric covering over the curable polymeric material. Heat is applied, preferably from an external heat source, to cause the article to recover, i.e. shrink, so that the heat activatable adhesive comes into contact with the curable composition. The curable composition is permitted to cure at a temperature at which the polymeric article, i.e. the outermost polymeric layer, does not melt or flow. The outermost polymeric layer preferably comprises a polyolefin such as polyethylene or polypropylene; acrylic rubber; EPDM; nitrile rubber; epichlorohydrin elastomer; polysulfide; acrylic elastomer; butyl rubber or the like.

Each of the polymeric layers and the curable polymeric composition either independently or together may also contain appropriate other additives such as tackifiers, fillers, corrosion inhibitors, waxes, uncured epoxy resins, rubbers, stabilizers, adhesion promoters, e.g. for improving cathodic disbonding properties, and the like.

The following examples illustrate the invention. The compositions are tested for resistance to cathodic disbondment by using the hot melt adhesive sealant and epoxy composition to bond a heat shrinkable sleeve of polyethylene to a steel pipe. The polyethylene coated pipe is then tested by the method of ASTM G-42 method A to determine the resistance of the adhesive to cathodic disbondment and tested by the method of ASTM D-1000 for peel strength at ambient temperature and at 75° C.

DESCRIPTION OF THE PREFERRED EMBODIMENTS

EXAMPLES 1 THROUGH 11

A two component epoxy bisphenol A system which is amine rich was mixed and applied with a brush to clean, shotblasted steel pipe which is at a temperature of between ambient and about 175° C. as indicated in the Table I. The mixed epoxy system has been preheated to 50°-60° C. A heat shrinkable polyethylene outer layer is coated with a hot melt adhesive, either a copolymer of polyethylene and vinyl acetate (Adhesive #1), a copolymer of polyethylene and ethyl acrylate (Adhesive #2) or a blend of a polyamide and a polyethylene vinyl acetate, methacrylic acid terpolymer (Adhesive #3). The coated tube was applied to the coated pipe and recovered by torching. In Examples 4 and 5 only the heat shrinkable polyethylene outer layer is applied with no hot melt adhesive. Pipe and coating were allowed to rest for 24 hours before samples were tested. Controls using no epoxy at elevated temperature (125°-200° C.) and at 50°-60° C. also performed in similar manner. Samples prepared in such a manner were tested for peel strength at ambient temperature and at 75° C. (ASTM D-1000); and for cathodic disbonding resistance at 75° C. (ASTM G-42) and impact resistance (ASTM-G-14). The results are show in Table I and II.

TABLE I

| EXAMPLE | ADHESIVE | EPOXY COATED | PIPE TEMPERATURE | PEEL STRENGTH (PLI) AT: 23° C. | 75° C. | IMPACT RESISTANCE |
|---|---|---|---|---|---|---|
| 1 | Adhesive #1 | No | 125° C. | 14.0 | 1.0 | 33 in-lb |
| 2 | " | No | 50° C. | <1.0 | — | |
| 3 | " | Yes | 50° C. | 11.4 | 1.2 | 70 in-lb |
| 4 | " | Yes | Ambient (25° C.) | — | — | |
| 5 | " | Yes | Ambient (25° C.) | — | — | |
| 6 | Adhesive #2 | No | 175° C. | 8.5 | 0.5 | |
| 7 | " | No | 50° C. | <1.0 | — | |
| 8 | " | Yes | 50° C. | 7.2 | 0.4 | |
| 9 | Adhesive #3 | No | 50° C. | — | <1.0 | |
| 10 | " | Yes | 50° C. | >90.0 | 3.0 | |
| 11 | " | No | >175° C. | >90.0 | 3.0 | |

TABLE II

| ADHESIVE | EPOXY COATED | PIPE TEMPERATURE | CATHODIC DISBONDING RADIUS AT 75° C. (mm) | | |
|---|---|---|---|---|---|
| | | | 1 WK. | 2 WKS. | 4 WKS. |
| Adhesive #1 | No | 125° C. | 5 | Complete(1) | — |
| " | Yes | 50° C. | 4 | 6 | 15 |
| " | Yes | Ambient (25° C.) | 2 | 3 | 3 |
| " | Yes | Ambient (25° C.) | 3 | 7 | 10 |
| Adhesive #2 | No | 175° C. | 20 | 35 | 50 |
| " | Yes | 80° C. | 7 | 9 | 11–13 |
| Adhesive #3 | No | 50° C. | Complete(1) | — | — |
| " | Yes | 50° C. | — | — | 10 |
| " | No | >175° C. | Complete(1) | — | — |

1. Complete disbondment of coating from the substrate.
2. Epoxy painted on substrate.
3. Epoxy sprayed on substrate.

EXAMPLE 12

In a manner similar to Examples 1–6 the epoxy bisphenol A materials were applied to substrates. A single layer of a crosslinked blend of HDPE, EMA, EPDM and about 20% carbon black was applied as a sheet to the epoxy and the epoxy allowed to cure. The cathodic disbonding radius in 30 days at 95° C. was between 10–12 mm for all samples tested.

EXAMPLE 13

In another experiment compositions similar to Example 1–11 were tested, however some of the bisphenol A epoxy resins contained plasticizers or flexibilizers and the like which are known to allow moisture to intrude. Other combinations of resin and curing agent and layers were such that no interaction between layers occurred. In all cases samples showed complete disbondment of the primer or adhesive when tested for cathodic disbonding at 75° C. for 30 days.

EXAMPLE 14

In the following Examples a bisphenol A epoxy was cured with varying amounts of an amine curing agent and a backing coating with adhesive #1 as used in Examples 1–6. 100% represents equal reactive amounts of each component in the curable polymeric composition.

| Mix Ratio Epoxy/Amine | Reactive Amounts | | Cathodic Disbonding @ 60° C. - 30 days (1) mm | Tg °C. |
|---|---|---|---|---|
| 100/10 | 58% | Epoxy Rich | 26(2) | 69 |
| 100/17 | 100% | | 19 | 72 |
| 100/30 | 170% | Amine Rich | 16 | 73 |
| 100/40 | 230% | Amine Rich | 16 | 68 |
| 100/50 | 290% | Amine Rich | 24 | 49 |
| 100/60 | 345% | Amine Rich | 23 | 25 |
| 100/80 | 460% | Amine Rich | 25 | <25 |
| 100/100 | 575% | Amine Rich | 23 | <25 |

(1) avg. of at least 3 samples.
(2) loss of adhesion between hot melt and primer as well as blister in primer.

What is claimed is:

1. A method of applying a protective covering to an elongate substrate which comprises:
   (a) applying to the substrate at a temperature of not more than about 80° C., a curable polymeric composition which is a liquid at about 20° C., is curable to a substantial extent within about 24 hours at a temperature of not more than about 80° C., and comprises
      (i) a resin component which is a liquid at 20° C.; and
      (ii) a curing agent;
   (b) applying a single layer, polymeric article comprising a material capable of interacting with said curable composition, over the curable polymeric composition in a manner such that a surface of the article is in intimate contact with the composition; and
   (c) allowing the curable composition to cure while maintaining intimate contact between the polymeric article and said composition at a temperature at which the material of the article does not melt or flow.

2. A method in accordance with claim 1, wherein said curing agent comprises a Bronsted base.

3. A method in accordance with claim 2, wherein said Bronsted base is present in an amount of 0.01 to about 2 moles in excess of that required to cure the composition.

4. A method in accordance with claim 3, wherein said Bronsted base is an amine.

5. A method in accordance with claim 1, wherein said curable polymeric composition comprises a Bisphenol A epoxy resin, a polyamide and a tertiary amine.

6. A method in accordance with claim 1, wherein said curable polymeric composition further comprises about 0.1 to about 10% by weight, based on the weight of the composition, of a silane.

7. A method in accordance with claim 1, wherein the curable composition contains less than about 5% by weight, based on the weight of the composition, of a solvent.

8. A method in accordance with claim 1, which further comprises the step of heating the substrate to a temperature of not more than about 80° C. prior to applying said curable composition.

9. A method in accordance with claim 1, wherein said curable composition is cured at a temperature of not more than about 80° C.

10. A method of applying a protective covering to an elongate substrate which comprises:
    (a) applying to the substrate at a temperature of not more than about 80° C., a curable polymeric composition which is a liquid at about 20° C., is curable to a substantial extent within about 24 hours at a temperature of not more than about 80° C., and comprises
       (i) a resin component; and
       (ii) a curing agent;
    (b) positioning a single layer, heat recoverable polymeric article comprising a material capable of interacting with said curable composition around the substrate and applying heat to cause the article to recover into intimate contact with said curable composition; and (c) allowing the curable composition to cure while maintaining intimate contact between the polymeric article and said composition.

11. A method of applying a protective covering to an elongate substrate which comprises:
   (a) applying to the substrate a curable polymeric composition comprising:
      (i) a resin component which is a liquid at about 20° C.;
      (ii) a curing agent; and
      (iii) a Bronsted base in an amount sufficient to provide an excess of Bronsted base in the composition when cured;
   (b) applying a polymeric layer over the curable polymeric composition such that a surface of the polymeric layer is in intimate contact therewith, said polymeric layer being capable of interacting with said curable composition; and
   (c) allowing the curable composition to cure while maintaining intimate contact between the polymeric layer and said composition.

12. A method in accordance with claim 11, wherein said Bronsted base is present in an amount of 0.01 to about 2 moles in excess of that required to cure the composition.

13. A method in accordance with claim 12, wherein said Bronsted base is an amine.

14. A method in accordance with claim 11, wherein said curable polymeric composition comprises a Bisphenol A epoxy resin, a polyamide and a tertiary amine.

15. A method in accordance with claim 11, wherein said curable polymeric composition further comprises about 0.1 to about 10% by weight, based on the weight of the composition, of a silane.

16. A method in accordance with claim 11, wherein the curable composition contains less than about 5% by weight, based on the weight of the composition, of a solvent.

17. A method in accordance with claim 11, which further comprises the step of heating the substrate to a temperature of not more than about 80° C. prior to applying said curable composition.

18. A method in accordance with claim 11, wherein said curable composition is cured at a temperature of not more than about 80° C.

19. A method of applying a protective covering to an elongate substrate which comprises:
   (a) applying to the substrate a curable polymeric composition comprising:
      (i) a resin component which is a liquid at about 20° C.;
      (ii) a curing agent; and
      (iii) a Bronsted base in an amount sufficient to provide an excess of Bronsted base in the composition when cured;
   (b) positioning a heat recoverable polymeric layer which is capable of interacting with said curable composition around the substrate and applying heat to cause the article to recover into intimate contact with said curable composition; and
   (c) allowing the curable composition to cure while maintaining intimate contact between the polymeric layer and said composition.

20. A method in accordance with claim 19, wherein the heat recoverable article is coated on one surface thereof with a heat activatable sealant and said article is positioned around the substrate such that the heat activatable sealant is the innermost layer which comes into intimate contact with said curable composition.

21. A method in accordance with claim 20, wherein the heat activatable sealant comprises a polyamide or ethylene terpolymer based hot melt adhesive.

* * * * *